Aug. 5, 1941.  G. P. BENTLEY ET AL  2,251,436
VIBRATION MEASURING AND RECORDING APPARATUS
Filed March 30, 1937  2 Sheets-Sheet 1
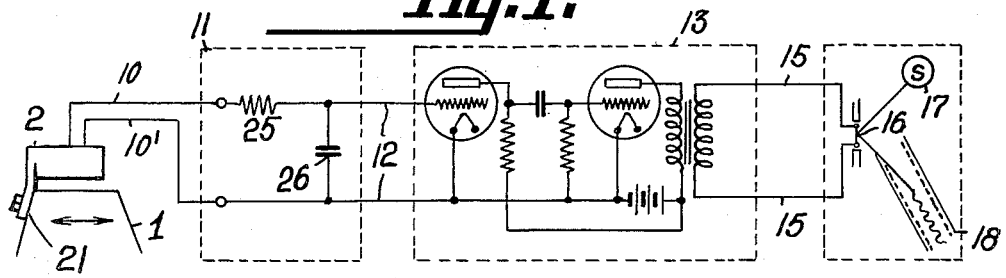
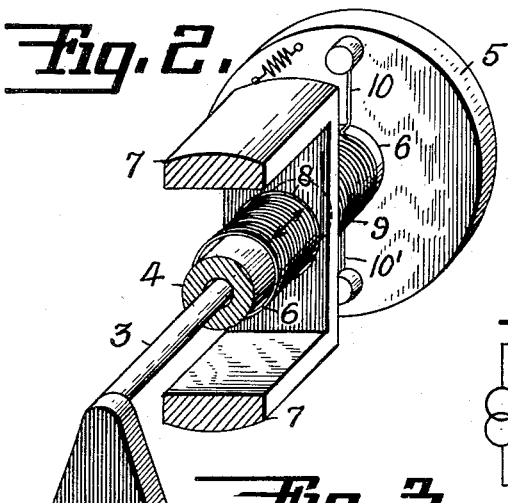
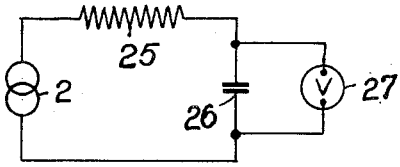
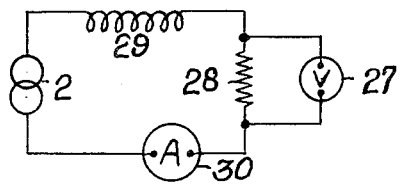
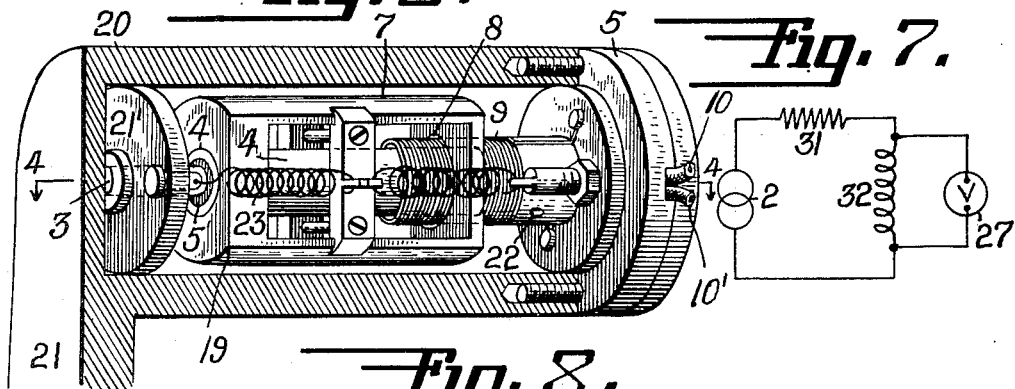
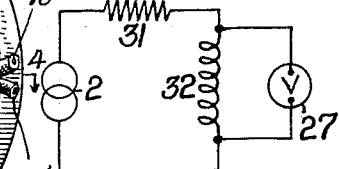
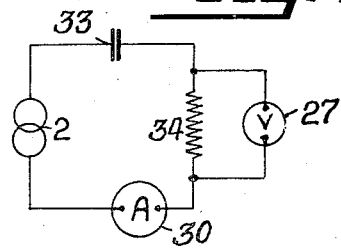
INVENTORS
George P. Bentley
Charles S. Draper
BY
Herbert H. Thompson
THEIR ATTORNEY

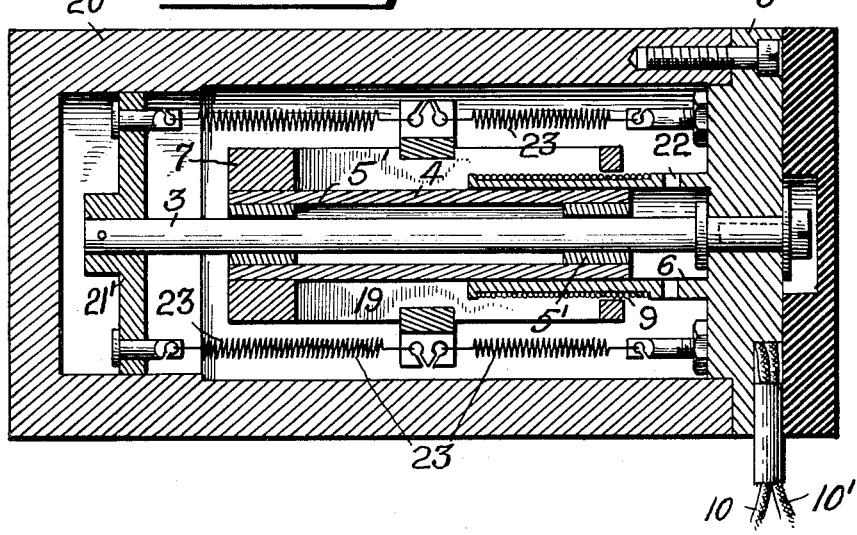

Patented Aug. 5, 1941

2,251,436

UNITED STATES PATENT OFFICE 2,251,436

VIBRATION MEASURING AND RECORDING APPARATUS

George P. Bentley, Wollaston, and Charles S. Draper, Boston, Mass., assignors to Research Corporation, New York, N. Y., a corporation of New York Application March 30, 1937, Serial No. 133,834

3 Claims. (Cl. 171—209)

This invention relates, generally, to the measurement of the amplitude and frequency of vibrating motion, and in some instances of the first and second time derivatives thereof, and the invention has reference, more particularly, to a novel apparatus for accomplishing this purpose.

Mechanical vibration is often detrimental to the performance and structure of modern mechanisms, such as high performance engines, aircraft structures in flight, etc., and in many cases the effects of vibration become so severe that steps must be taken to reduce or even eliminate the same. Hence, it becomes necessary to provide suitable apparatus to measure vibratory motion in order to determine the severity of the vibration and estimate or measure the stresses incurred and to determine the source of disturbances, whereby the necessary information is obtained for effecting changes in design that will serve to reduce or eliminate the disturbance, the apparatus also serving to measure the actual change in vibration characteristics brought about by such design changes.

In the measurement of vibration, it is essential that any measuring element that is attached to a vibratory structure shall be sufficiently small so as not to substantially affect the vibration characteristics of the structure. Due to space or mass limitations, it is often inconvenient or impossible to use an instrument that measures or records at the point of investigation, and in such cases some transmission system must be used to permit measuring or recording vibration at a remote point.

The principal object of the present invention is to provide a novel apparatus for measuring and recording vibration without appreciably affecting the vibration characteristics of the member investigated, the said invention also being adapted for enabling the measurement and recording of vibration at one or more remote points by the use of a portable central unit or units convenient to the operator.

Another object of the present invention lies in the provision of a novel vibration measuring and recording apparatus including an electromagnetic generator for generating a voltage proportional to the relative velocity of the linear vibration of the object or member being observed, the said apparatus also including either an integrating circuit for electrically integrating the output of the generator where it is desired to record displacement of the vibration, or including a differentiating circuit where it is desired to record the acceleration of the vibration, the output of the integrating or differentiating circuit, as the case may be, being preferably amplified and then employed for operating an oscillograph galvanometer preferably used in conjunction with a photographic recorder, whereby a permanent record of the vibration is obtained.

Still another object of the present invention is to provide a novel apparatus of the above character that is of simple, rugged construction, the same being adapted to maintain its calibration over a long period of time and being adapted to measure vibrations over a wide range of frequencies, which latter feature, together with the feasibility of installing the recording system at a distance from the point at which vibration is measured, renders the apparatus especially suitable for use in connection with aircraft in flight.

Other objects and advantages will become apparent from the specification, taken in connection with the accompanying drawings wherein one embodiment of the invention is illustrated.

In the drawings,

Fig. 1 is a diagrammatic view of the general scheme of measurement according to a preferred embodiment of the present invention.

Fig. 2 is a schematic drawing, with parts broken away or omitted, of an electromagnetic generator for converting translational vibration energy into electrical energy.

Fig. 3 is a perspective view, with parts broken away, of the preferred form of electromagnetic energy converter or pick-up unit employed by this invention.

Fig. 4 is an enlarged sectional view taken along line 4—4 of Fig. 3.

Fig. 5 is a wiring diagram of an electrical time integrating device similar to that shown in Fig. 1.

Fig. 6 is a wiring diagram of a somewhat modified form of time integrating device.

Fig. 7 is a wiring diagram of an electrical time differentiating device.

Fig. 8 is a wiring diagram of a somewhat modified form of time differentiating device.

Similar characters of reference are used in all of the above views to designate corresponding parts.

Referring now to Fig. 1 of the drawings, the reference numeral 1 designates any vibrating structure whose motion in a linear direction, such as in the direction of the arrows, it is desired to measure. In carrying out the purposes of the invention, an electromagnetic voltage generator or vibration pick-up unit 2 is attached to member 1 so as to partake of the linear vibration of this member. The construction of this voltage generator is illustrated schematically in Fig. 2 and in detail in Figs. 3 and 4. In Fig. 2 a supporting rod or element 3 is fixedly attached to the vibrating body and extends axially through a hollow cylindrical magnet 4 for supporting the latter while allowing free relative longitudinal movement of these members within limits. The free end portion of rod 3 has a disc 5 fixed thereon, which disc carries a hollow cylinder coil form or tubular support 6 into which the magnet 4 telescopes without actually contacting the coil form 6. The magnet 4 is provided with a rectangular yoke 7 of steel or other magnetic material (see also Figs. 3 and 4), which yoke has a circular aperture 8 for receiving and closely surrounding a coil 9 of fine wire on coil form 6.

The free end portion of the magnet terminates adjacent that end of the yoke having the aperture 8 therein so that this magnet maintains a strong and substantially uniform flux density in the annular air gap provided between the magnet and the yoke and through which air gap the coil form 6 projects. With this arrangement, any motion between the coil form and the magnet-yoke structure or seismic element produces a voltage across the terminal leads 10, 10' of coil 9, which voltage varies as the relative velocity of the vibration measured. The end portion of yoke 7 which encircles coil 9 is much smaller in axial length or thickness than the axial length of said coil resulting in a narrow and substantially constant radial field intersecting the coil regardless of the mean position of the yoke. This is of considerable importance since it is often necessary to measure vibratory motion while the vibrating body is subjected to steady or slowly changing acceleration, which, if a component occurs along the axis of the magnet and coil, causes the mean position of the end piece of the yoke to depart axially from the center of said coil. Since by this design the magnetic field cutting the coil is independent of the position of the yoke, within limits, the voltage generated in the coil will be constant for a given vibration regardless of said position.

Leads 10, 10' supply this voltage to an electrical time integrating circuit arrangement 11 (Fig. 1) which in turn electrically integrates this voltage to produce a voltage across its output leads 12 proportional to the time integral of the voltage variations of generator 2, i. e., to the instantaneous vibration displacement of the structure 1. This displacement voltage is supplied to an amplifier 13 that serves to produce current variations in its output circuit corresponding to the voltage fluctuations supplied thereto by leads 12. The output of amplifier 13 is supplied through leads 15 to an electromagnetic oscillograph mirror galvanometer 16 that serves to deflect a light beam from a source 17, which deflected beam is used to produce a continuous photographic record of the instantaneous output current of amplifier 13 on a moving film 18. Because of the proportionality relations maintained throughout the system, the recorded amplitudes are substantially proportional to the vibratory displacements of structure 1 throughout the useful range of the instrument.

In the detailed illustration of the electromagnetic voltage generator or energy converter shown in Figs. 3 and 4, the same is shown as having the form of a cylindrical housing 20 having a closed and an open end, the closed end being shown provided with a projection 21 for attaching the housing to the vibrating structure 1. The disc 5 is secured to the open end of the housing 20 and has the rod 3 fixed thereto so as to extend axially within the housing, the other end of the rod being fixedly supported within the housing by means of a disc 21'. The seismic element 19 has the hollow magnet 4, provided with bushings 5', slidably mounted on rod 3, the magnet 4 also having a loose sliding fit within coil form 6. This coil form is provided with small apertures 22 which permit a limited circulation of oil for effecting the damping of the seismic element.

The seismic element is coupled weakly to the housing 20 by means of suitable springs 23 that have their outer ends attached to stationary pins carried by the housing and disc 21' and their inner ends secured to projections provided on the central portion of the seismic element. The housing 20 is filled with oil or other suitable viscous fluid, which serves to damp the seismic element owing to the fact that the relative motion between this element and the coil form 6 produces a pumping action within the interior of this coil form, acting to force oil in and out through apertures 22. Since the magnet suspension has a certain definite frequency, by thusly properly damping the same, the relative motion between the coil 9 and the magnet 4 is substantially proportional to the vibratory motion of the body 2 over all frequencies in excess of two or three times the natural frequency of the magnet suspension. Thus, the induced voltage in the coil 9 is substantially proportional to the vibration velocity of the body 2 and, by making the natural frequency of the seismic element very low, vibratory motions of very low frequency may be measured, thereby adapting the generator for general use, including vibration measurement of aircraft structures.

If measurement of the vibration displacement is desired, the instantaneous vibration velocities must be integrated with respect to time; such time integration of the instantaneous output voltages of the electromagnetic pick-up unit serving to produce voltage impulses substantially proportional to the vibration displacement to which the unit is subjected. Such time integration of the electrical voltage impulses may be carried out by use of the circuit shown in Fig. 5. In this circuit, a resistor 25 is connected in series with a capacitor 26 and with a source of fluctuating impulse 2 corresponding to the pick-up unit. If the instantaneous voltage of pick-up 2 is $e$ volts and resistor 25 and capacitor 26 are proportioned so that, over the working range of frequencies, the electrical impedance of the capacitor is small compared to that of the resistor, the instantaneous voltage $e_c$ across the capacitor 26 as measured by the voltmeter 27 will be substantially proportional to the time integral of the instantaneous voltages expressed mathematically as follows:

$$e_c = K \int_0^t e\, dt$$

Fig. 6 shows a slightly modified circuit for accomplishing the same result. In this figure, resistor 28 and an inductor 29 are arranged in series with the pick-up source 2 of E. M. F. If the resistor 28 and inductor 29 be proportioned so that, over the working range of frequencies, the electrical impedance of the inductor is high compared to that of the resistor, either the instantaneous voltage across the resistor 28 measured by voltmeter 27 or the instantaneous current in the series circuit measured by the ammeter 30 will be substantially proportional to the instantaneous value of the time integral of the voltage fluctuations at 2.

The method of electrical integration shown in Fig. 5 has been incorporated in the arrangement of the invention illustrated in Fig. 1. In this figure, the output of this integrating circuit, instead of being connected to the voltmeter 27 or other indicating means, is connected through a linear amplifier 13, shown in Fig. 1, to operate a suitable indicating means, such as the electromagnetic oscillograph, mirror galvanometer 16.

In the event that it is desired to indicate the acceleration of the vibration, such indication may be obtained by using a differentiating circuit in lieu of the integrating circuits of Figs. 5 and 6. Thus, in Fig. 7, the pick-up unit 2 is shown connected in series circuit with a resistor 31 and an inductor 32, across the terminals of which inductor is connected the voltmeter 27. If the resistor 31 and inductor 32 are proportioned so that, over the working range of frequencies the electrical impedance of the inductor is low compared with that of the resistor, the instantaneous voltage across the inductor 32 will be substantially proportional to the instantaneous time rate of change of the voltage supplied by 2, i. e., to the acceleration of the pick-up voltage output.

In Fig. 8 a series circuit, including the pickup 2, capacitor 33 and resistor 34, is designed so that, over the working range of frequencies, the electrical impedance of the capacitor is high compared with that of the resistor, thereby producing an instantaneous voltage across the resistor 34 and indicated by voltmeter 27, which voltage is substantially proportional to the time rate of change of the voltage fluctuations of the output of unit 2, or, if desired, the instantaneous current in the circuit which is also proportional to the time rate of change of voltage fluctuations of 2 may be measured by the ammeter 30.

Should the seismic element 19 be coupled by the use of relatively stiff springs to the housing 20, that is, if the springs 23 are made relatively stiff so that the force exerted thereby is large compared to the vibratory acceleration force, then the stretch of these springs will be proportional to the instantaneous accelerations so that the voltage output of the pick-up unit 2 will then be proportional to the accelerations of the body 1.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A means for converting energy of vibratory mechanical motion in a given direction into electric energy comprising, in combination, a spring restrained magnet, said magnet being substantially unaffected by vibratory motions of the instrument case above a predetermined frequency, a coil of wire secured to the instrument case though electrically insulated therefrom and extending through a radial magnetic field established by said magnet, relative motion between said coil and said magnet being substantially equal to the vibratory motion along the instrument axis of the structure to which said instrument case and coil are rigidly attached, said relative motion inducing in said coil an electrical voltage proportional to the instantaneous velocity of relative motion and therefore substantially proportional to the instantaneous vibratory velocity of said structure above said frequency limit, and means for damping the motion of said spring restrained magnet relative to said coil comprising a fluid mass, a restricted orifice, means responsive to the motion of said magnet for forcing a portion of said mass through said orifice whereby free or unforced vibration of said magnet at its natural frequency is prevented.

2. In a device for the measurement of vibratory velocity, a housing, a cylindrical coil supported thereon, a magnetic member including a magnet mounted for motion relative to said housing along the axis of said coil and having an annular air gap coaxial with said coil in which the same relatively moves, the axial length of said coil being large in comparison with the axial length of said gap, a resilient restraint for said magnetic member so constructed and arranged as to allow movement of the field of said gap along substantially the entire length of said coil to eliminate errors due to steady accelerations, said restraint forming with the mass of said magnetic member an oscillatory system having a natural frequency of vibration that is a fraction of the lowest frequency of vibration to be measured, and viscous damping means for preventing free vibration of said member at the natural frequency of said system, whereby vibration of said housing causes the generation of an E. M. F. in said coil proportional to the velocity of said vibration above a predetermined limiting frequency uninfluenced by steady accelerations to which said housing may be subjected over a wide range of values and undistorted by components at the natural frequency of said oscillatory system.

3. In a device for the measurment of vibratory velocity, a housing, a cylindrical coil, a tubular support therefor provided on said housing, a spring restrained magnetic member projecting into said tubular support and axially movable relative to said coil, said magnetic member including a cylindrical permanent magnet of such nature that the same produces a radially directed magnetic field across said coil, said housing having a viscous fluid substantially filling the same, said tubular support having a restricted orifice through which a portion of said fluid displaced by the motion of said magnetic member therewithin is constrained to flow, causing said latter member to be subject to viscous damping, whereby relative motion between said magnetic member and said coil generates an E. M. F. in said coil proportional to the velocity of said motion, the damping of the magnetic member preventing free or unforced vibration of said member at its natural frequency.

CHARLES S. DRAPER.
GEORGE P. BENTLEY.